March 30, 1937.  R. J. SPEIR  2,075,592

PHONOGRAPHIC DICTATION MACHINE

Filed Nov. 23, 1933   3 Sheets-Sheet 1

Inventor
Robert J. Speir,
By E. E. Overholt,
Attorney.

March 30, 1937.   R. J. SPEIR   2,075,592
PHONOGRAPHIC DICTATION MACHINE
Filed Nov. 23, 1933   3 Sheets-Sheet 2

Inventor
Robert J. Speir,
By
E. E. Overholt,
Attorney.

March 30, 1937.  R. J. SPEIR  2,075,592
PHONOGRAPHIC DICTATION MACHINE
Filed Nov. 23, 1933  3 Sheets-Sheet 3
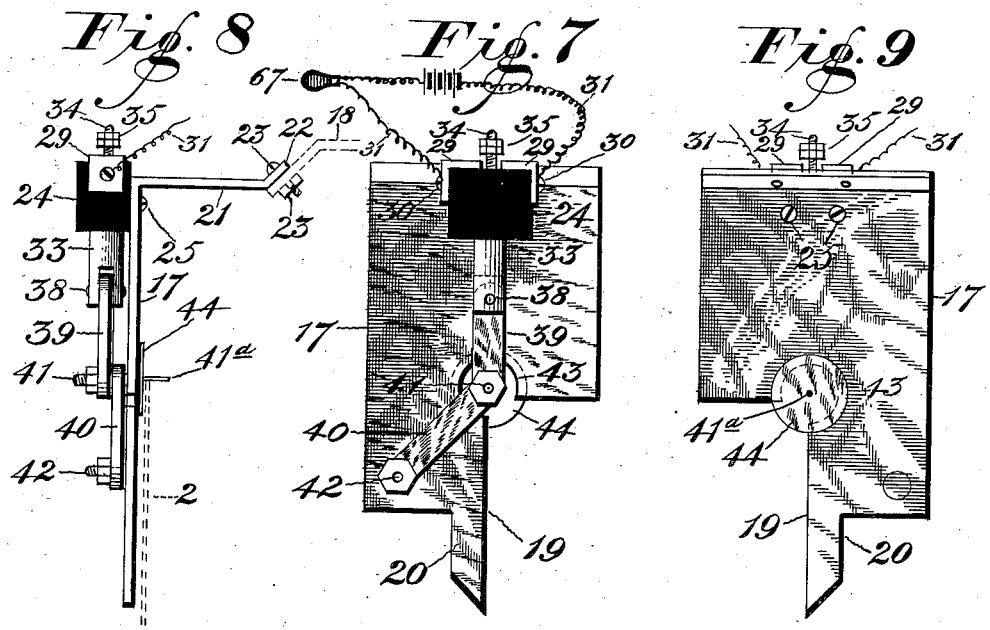
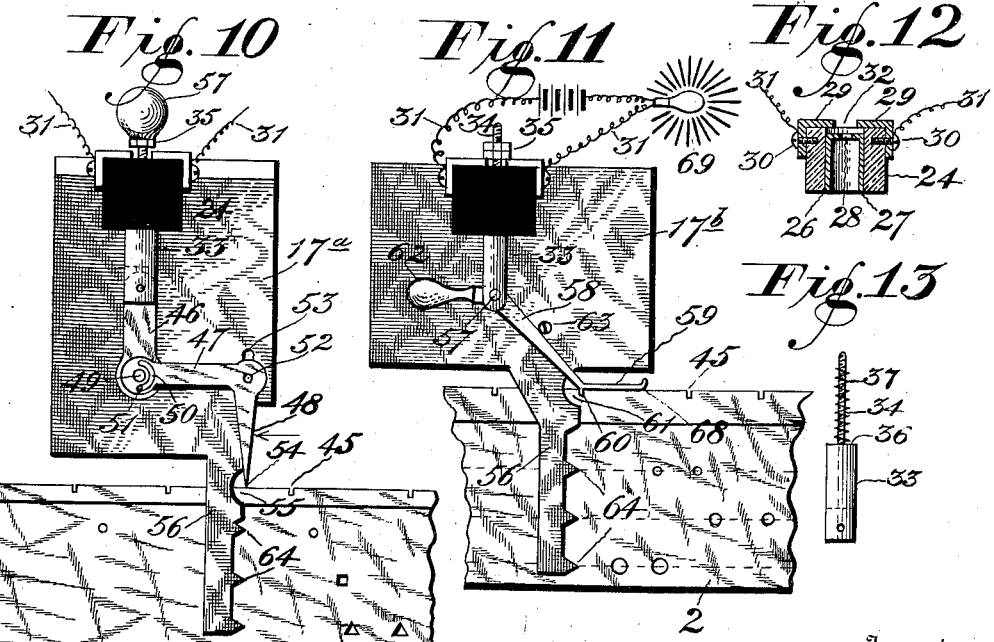
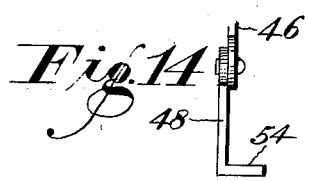
Inventor
Robert J. Speir,
By E. E. Overholt,
Attorney.

Patented Mar. 30, 1937

2,075,592

UNITED STATES PATENT OFFICE 2,075,592

PHONOGRAPHIC DICTATION MACHINE

Robert J. Speir, Takoma Park, Md.

Application November 23, 1933, Serial No. 699,412

25 Claims. (Cl. 274—17)

My invention relates to phonographic recording and reproducing machines, as they are employed in business offices for correspondence and general dictation purposes, disclosing particularly an indexing system therefor.

Under date of July 8, 1930, there was issued to applicant Patent Number 1,770,326, which covered, among other things, an indexing system for phonographic machines adapted to record and reproduce the proceedings of public bodies of which stenographic reports are ordinarily made, and, roughly speaking, applicant's present invention relates to the adaptation of a similar indexing system to the business office type of phonographic machine, involving the use of some special devices hereinafter fully explained.

The main objects of the invention are (1) to provide means whereby one may dictate consecutively on a phonographic cylinder, without waste of space, letters, telegrams, briefs, reports, and other matter of which transcriptions are desired in business offices, including inserts, changes, corrections or modifications of the same, with reasonable assurance that proper transcriptions will be made of such matter; and (2) to provide means for producing simultaneously with the record made on the phonographic cylinder, an auxiliary record indicating points in the main record containing the matter to be transcribed to which it is desired to direct the transcriber's attention, said auxiliary record containing in itself no matter to be transcribed, but simply indications for the information and guidance of the transcriber in locating points on the main record, marking, for illustration, the beginning and ending of letters, matter in which corrections are to be made, the dictation embodying the correction matter, etc.

Inasmuch as the auxiliary record performs its indexing function in two ways, first, indicating directly by signs carried by itself points on the main record to which it is desired to call the attention of the transcriber, and, second, indicating such points indirectly by operating a signal detached from and not in itself a part of said auxiliary record, it is believed desirable to designate the two methods by different terms. Since the indexing office performed by the latter indirect method is strikingly similar to that of the caret sign in the correction and revision of written or printed matter, this latter part of the indexing insignia will be hereinafter referred to as the caret record. It should be noted at this point that the caret record, as it is produced in connection with the operation of the recording machine, consists of narrow open-top cuts or notches in the upper edge of a strip of paper, or other suitable material, and that said caret record, when used in connection with the reproducing machine, performs a function different from that accomplished in connection with the recording machine, but entirely supplementary thereto, in that it serves to control a signal which automatically, and quite independently of any action on the part of the transcriber, notifies him that he has reached a point in the transcription of the matter on the main record where an insert, correction or change of some sort is to be made. Therefore, the caret record, as it is termed when formed in connection with the recording operation, may be very appropriately referred to as the signal record in connection with the reproducing operation. This signal record is of the utmost importance in connection with applicant's indexing system, in that it affords an absolutely certain means of attracting the attention of the transcriber at points where he should suspend writing operations and receive instructions from the dictator as to inserts, corrections, changes, etc.—something that is not accomplished by any other indexing system of which applicant has any knowledge.

At this point attention is called to the distinctions to be drawn between functions performed by the auxiliary record and the methods used in performing them, so that if the designation term "caret record" is used in claims referring to the recording mechanism, and the designation term "signal record" in connection with claims referring to the reproducing mechanism, no confusion will be occasioned thereby. As stated above, these designations are entirely appropriate because they relate to separate functions performed by the auxiliary record in connection with the two different operations of recording and reproducing.

Referring now to the reproducing operation, it is the object of applicant's indexing system to provide for the transcriber an immediate and comprehensive view of the actual make-up and content of the primary record carried on the wax cylinder, including the location and beginning and ending of the different parts making up such record, as well as the order in which the several parts are to be transcribed. To this end, means are provided whereby the transcriber is apprised whether there is "rush" matter dictated on the cylinder, requiring attention ahead of everything else recorded thereon, and whereby he is enabled to give letters their proper position on the sheets of paper by noting their length as indicated by the index signs marking the beginning and ending of the same. In addition, as already set out in the foregoing paragraphs, means are provided in the form of an automatic signal to prevent the transcriber from overlooking or forgetting to make inserts or corrections at the proper points in the matter recorded on the phonographic cylinder.

In working out the details of applicant's invention, and in providing the necessary mechanical devices for successfully operating the same, one of the most important considerations, and one on which the practical effectiveness of the indexing system hinges, is a circuit maker and breaker for the control of a flash signal under conditions requiring the circuit making and breaking operations to be performed quickly and at times with great frequency, it being necessary, where the corrections, insertions, etc., come closely together on the phonographic record, or cylinder, to have the flash signals follow each other in rapid succession. These conditions make it important that the smallest possible space on the auxiliary record be utilized in a circuit making and breaking operation.

Other objects and purposes of applicant's invention will be referred to in the subjoined description.

Another specific feature of the invention consists of a recording mechanism carrying along with its sound-box carriage and recording stylus a manually operated multiple punch provided with a plurality of punches in vertical alignment with each other, and a strip of paper along which said punch travels as the recording stylus is advanced, one of said punches being so designed as to cut narrow open-sided notches in the upper edge of the strip of paper, said notches being so arranged as to control the circuit making and breaking apparatus of the device when the strip of paper is transferred, along with the phonographic cylinder of which it forms an index, from the recording to the reproducing machine, as is elsewhere in this specification more fully set forth.

An important feature of the circuit maker and breaker, above referred to, consists of two cooperating members, one stationary and the other movable relatively thereto into and out of electrical contact position, the stationary member having a narrow open-sided notch arranged to control the movements of the other member. Speaking more specifically of this feature of the invention, the device is arranged to include a longitudinally extending strip of heavy paper or cardboard, held preferably in a vertical position, and provided on its upper edge with narrow notches at the points relative to the record on the phonographic cylinder where signals are to be given, said notches having vertical side walls; and another member adapted to ride on said notched upper edge into and out of said notches so as to bring the latter member into and out of electrical contact position, the latter member being so mounted and arranged that as it rides forward along the edge of the strip of paper and falls into a notch, the resistance offered by the forward vertical side of the notch to its further forward motion will operate to promptly lift said member out of the notch without stopping its forward movement.

In this connection, it is important to note (1) that the part of the auxiliary record hereinbefore referred to as the direct index and the part referred to as the caret record are both formed by the punch mounted on the sound-box carriage of the recording machine, on a single strip of paper, the caret record being in the top edge of the strip, and, therefore, above the direct index portion of the auxiliary record; and (2) that the same strip of paper accompanies the phonographic cylinder, the same being transferred along with the cylinder to the reproducing machine, where it becomes a master or control record for indicating the order in which the several parts of the primary record shall be reproduced for transcription, as well as indicating by flash signals the points on the cylinder where corrections or changes of any sort are to be made.

It should be further noted that there is attached to the sound-box carriage of the reproducing machine, to which the strip of paper containing the direct auxiliary record and the caret record is transferred with the phonographic cylinder from the recording machine, a member comprising (1) a signal controlling mechanism adapted to cooperate with the signal record in the top edge of the strip of paper, and (2) a finger extending across the strip of paper in a position to traverse the auxiliary record, said member being in the same position relatively to the reproducing stylus that the punch was relatively to the recording stylus, and traveling with the reproducing mechanism in relatively the same position in which the punch traveled with the recording mechanism. The forward vertical edge of the transverse finger is in vertical alignment with the reproducing stylus, just as the plungers of the multiple punch are in vertical alignment with the recording stylus, the forward vertical edge of the traversing finger forming an indicator or guide by means of which the reproducing mechanism may be quickly and accurately set at any desired punched sign on the strip of paper, thereby readily bringing the reproducing stylus into the same relative position on the phonographic cylinder that the recording stylus occupied when the punch sign was made.

My invention consists of certain novel features of construction and arrangement of parts, which will be hereinafter described and claimed, reference being had to the accompanying drawings, in which—

Figure 7 is a front elevation of one form of the movable part of the circuit maker and breaker employed with the reproducing part of my mechanism, the strip of paper that has been operated upon by the recording machine constituting the other part, and forming a master record for controlling the operation of said movable part. This figure also shows a diagrammatic view of one form of arranging the electrical circuit.

Figure 8 is a side elevation of said movable part illustrated in Figure 7, with the cooperating strip of paper shown in dotted lines.

Figure 1:
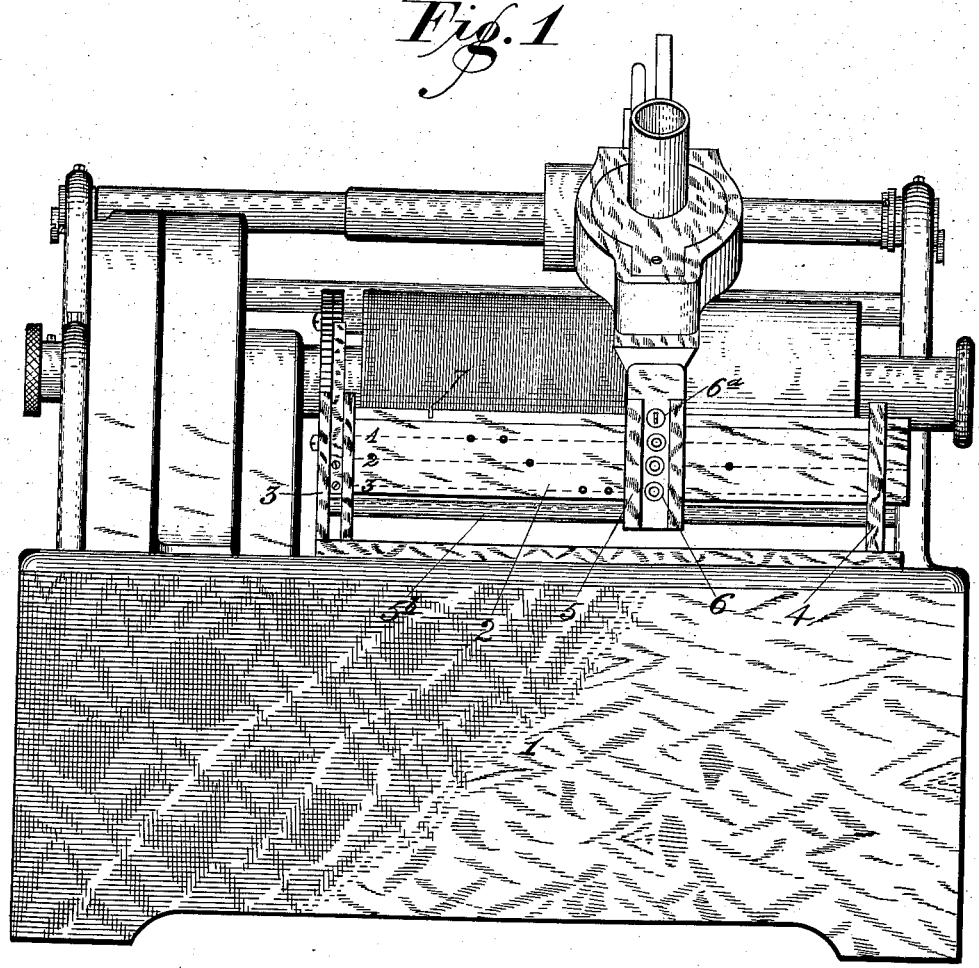
Figure 1 is a front elevation of a recording machine equipped in accordance with the principles of my invention, with the levers which operate the plungers of the multiple punch omitted for clearness.
Figure 2:
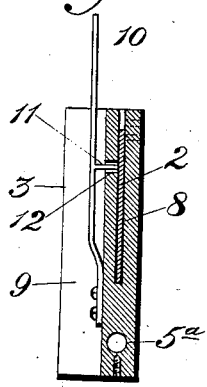
Figure 2 is a sectional view of the clamp holding the strip of paper which constitutes a part of my improvement.

Figure 9 is a rear elevation of Figure 1.

Figure 10 shows a slightly modified form of said movable part of the device.

Figure 11 shows another slightly modified form with the parts in electrical contact position.

Figure 12 is a sectional view of the insulation of the movable part of the circuit maker and breaker, and of the parts connected directly with said insulation.

Figure 13 is a side elevation of the spring-pressed piston which is received into the insulation illustrated in Figure 12.

Figure 15:
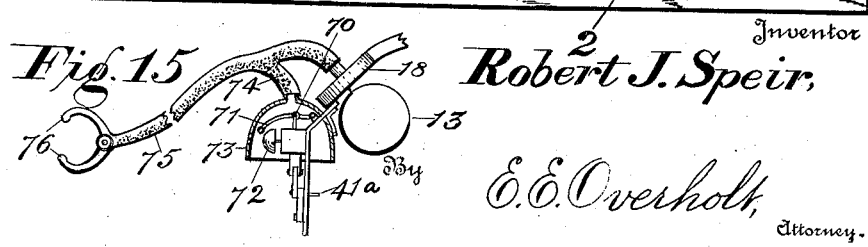

Figure 14 is an edge view of the foot portion of the form of the device illustrated in Figure 10, said foot portion being adapted to ride on the upper edge of the strip of paper which forms the master record for controlling the circuit maker and breaker; and Fig. 15 is a modification showing purely mechanical means for audibly arresting the actuator of the transcriber.

Referring further to the drawings, Figure 1 shows a recording machine equipped in accordance with the principles of my invention. This machine is of ordinary construction, but with the following additions: Mounted on the forward side of the cast iron box 1, which forms a pedestal for the wax cylinder and the parts cooperating therewith, is a strip of heavy paper 2. This strip is supported at its left end by a paper grip 3, and at its other end by a post 4, while between its ends it passes through a multiple punch 5, having its plungers 6 arranged in vertical alignment. The upper end of this punch is rigidly secured to the sound-box carriage so that it moves with it. The lower end of the punch has a bore 5a snugly fitting a rod 5b, which forms a guide for it to insure that it shall always be held in a true vertical position. The upper one (6a) of the plungers 6 is in a plane with the top edge of the strip of paper 2, and is designed to cut a narrow notch 7 in said edge, with the upper side of the notch open. The other plungers 6 are preferably arranged in vertical alignment with the center of the recording stylus. They are designed to be operated manually by means of levers, but for the sake of clearness of illustration, the levers are omitted from the drawings. Where it is desirable to provide for the operation and control of a recording machine from a distance, the punches, of course, could be operated by means of electro-magnets in the manner set forth and described in applicant's Patent Number 1,770,326.

Figure 3:
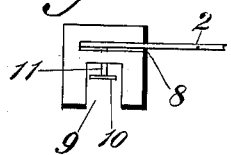
Figure 3 is a top plane view thereof.

To insure accuracy, it is important that the strip of paper 2 should be held longitudinally in an exact predetermined position relative to the recording stylus and the punches, so that when it is placed in the reproducing machine, to which reference will be made hereinafter, it can be made to occupy exactly the same position relatively to the reproducing stylus that it here occupies relatively to the recording stylus. To this end, the paper grip 3 is provided with a transverse slot 8 which extends only partly across the grip, so that the inner end of said slot forms an abutment for the end of the strip of paper to be set against when it is placed in the paper holder or rack attached to the machine, as is clearly shown in Figure 3. The grip has a deep slot 9 in its front side, and in this slot there is mounted a spring lever 10 which carries a rigid pin 11, which, in turn, passes through a small bore 12 and presses the strip of paper 2.

This strip of paper 2 forms a very important feature of my invention, and stands equally related in utility to the recording machine and the reproducing machine, and after the record has been completed on the recording machine, this strip of paper is transferred bodily to the reproducing machine where it forms what I have termed a master record for controlling certain important operations of that machine, as will be more fully explained hereinafter.

From the foregoing it will be seen that the strip of paper containing the index record forms a connecting link between the two machines, forming an essential part of each machine, so far as applicant's indexing system is concerned, and that it is so vitally related to each machine that the indexing system would be inoperative as to either machine unless it were applied to both. This index record strip constitutes the apex of the invention, since all the other parts and features are operated with reference to it. Manifestly, therefore, a complete description of the index strip will be better understood after the reproducing machine and the devices connected therewith have been described.

Figure 4:
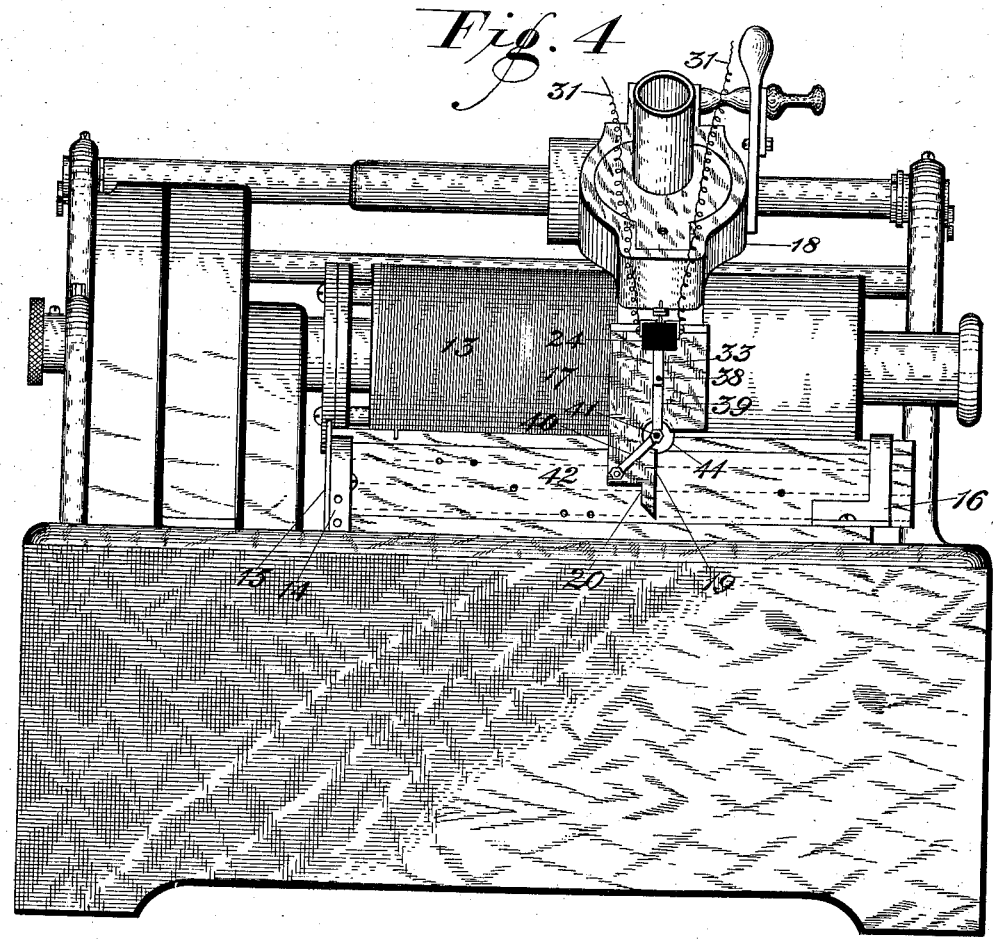
Figure 4 is a front elevation of a reproducing machine equipped in accordance with the principles of my invention.
Figure 5:
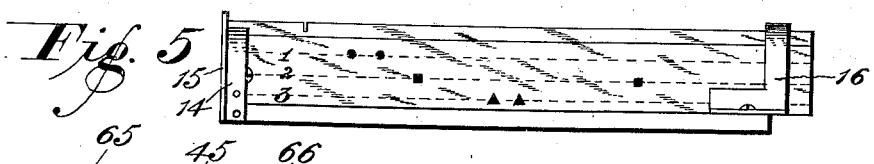
Figure 5 is an elevation showing the strip of paper referred to in Figure 1, as it appears when transferred to the reproducing machine and mounted in the rack or holder provided for it thereon.

Figure 4 represents the reproducing machine equipped in accordance with the principles of my invention, the same being the companion machine to the recording machine illustrated in Figure 1. It is to this reproducing machine that the strip of paper 2 has been transferred from the recording machine, along with the phonographic cylinder containing the record to be transcribed with the aid and guidance of the index record.

It will be observed that the strip of paper 2 stands in exactly the same relative position to the cylinder 13 that it did when said cylinder and index strip were on the recording machine. The strip, it will be noted, is held securely in its position by means of a spring-actuated paper clamp 14; and the left end of the strip of paper is placed against an abutment 15, which insures that it will be in the exact position relatively to the cylinder that it occupied in connection with the recording machine. At its right end the index strip 2 is suitably held by the L-shaped support 16.

In this reproducing machine, the movable part 17 of the circuit making and breaking mechanism occupies exactly the same position relatively to the reproducing stylus that the punch 5 occupied relatively to the recording machine's stylus.

At its lower end the plate 17 is partly cut away to form the vertical edge 19, which extends across the strip of paper in alignment with the point of the reproducing stylus, which stylus is on the under side of the sound-box 18, said vertical edge 19 being in exactly the same position relatively to the reproducing stylus that the central vertical line of the punch 5 occupies in relation to the point of the recording stylus. This being the case, the vertical edge 19 forms a gauge for accurately indicating by means of and in conjunction with the punch marks on the strip of paper just where to move the carriage of the reproducing machine in order to bring its stylus to the same position on the wax cylinder that the recording stylus occupied when the punch mark in question was made. In other words, the arrangement just described enables the transcriber of the record to quickly find the point on the wax cylinder where any desired part of the record may be found and reproduced.

The lower downwardly projecting portion 20 of the plate 17 may be termed a finger, because it serves to point out the punch marks on the strip of paper.

I will now describe the circuit maker and breaker which constitutes an important feature of my device in connection with the signal which automatically notifies the transcriber whenever a point has been reached on the cylinder where an insert or correction or change of some sort is to be introduced.

The plate 17 (already referred to in connection with Figure 4) and the parts connected directly thereto forms the upper part of the circuit making and breaking mechanism, while the strip of paper 2 forms the lower part. The upper portion, with the exception of a little insulation, is formed of metal. The plate 17 is provided at its upper end with an integral right angled section 21, which terminates at its outer end in a short section 22 bent upwardly preferably at an angle of 45 degrees, and provided with suitable threaded bores for the reception of screw-bolts 23, by means of which the plate is rigidly connected with the reproducing mechanism 18 (see Figure 8) to travel therewith as a record is reproduced.

A block of insulation 24 is rigidly secured to the upper end of the plate by means of screws 25. This block of insulation 24 has a central vertical bore 26 (see Figure 12) provided with a bushing 27 having its upper end closed except for a small opening 28. L-shaped electrical contacts 29 are rigidly secured to the upper end of the block of insulation 24 at opposite sides thereof, by means of contact screws 30, which serve as binding posts to connect the electric wires 31 with the contacts 29.

There is a gap 32 (see Figure 12) between the two opposing contacts 29 at the upper end of the block of insulation 24, which gap will be referred to hereinafter. A piston or plunger 33, having a reduced upper portion 34, is snugly received into the bushing 27 of the insulation, with the reduced portion 34 passing up through the small bore 28 at the upper end of the bushing and projecting on up through the gap 32 to a point appreciably above the same. The upper end of this reduced portion 34 is threaded for the reception of the lock-nuts 35. At the junction of the sections 33 and 34 of the plunger a shoulder 36 is formed, and a spring 37 is mounted on the reduced section 34 and rests on the shoulder 36. When the plunger 33 is received into the bushing 27 and pressed upwardly therein, the spring 37 is compressed between the shoulder 36 and the upper end of the bushing 27, so that the spring tends to push the plunger downwardly. The plunger 33 at its lower end is pivotally connected by means of a pivot 38 to a link 39 held normally in alignment therewith. This link 39 at its lower end is connected with another link 40 by means of a pivot 41. This link 40 is disposed preferably at an angle of 45 degrees to its cooperating link 39, and is pivoted at its lower end to the plate 17 by means of the pivot 42.

The portion of the plate 17 adjacent to the pivot 41 is cut away as indicated at 43, and the pivot 41 extends on through this cutaway portion and terminates in a reduced section 41a, more clearly shown in Figure 8. This reduced end 41a of the pivot 41 normally rests on the top edge of the strip of heavy paper or cardboard 2, riding along said edge and dropping into the notches thereon as they are reached. For this reason it is desirable that the reduced section 41a should be reliably held in a horizontal position, and to assist toward this end, the pivot 41 is provided with a rigid disc 44 positioned to fit in flat engagement with the inner face of the plate 17, said disc being of larger diameter than the opening 43. It will be seen that this disc 44 will tend to brace the section 41a against any undue lateral movement. The plate 17 is carried along by the sound-box carriage of the reproducing machine, and the weight of the plunger 33 and the parts depending therefrom is normally borne up and held in a slightly elevated position by the reduced section 41a, which rides on the top edge of the strip 2 of heavy paper or cardboard, until one of the notches 45 therein is reached, when the reduced section 41a will drop into the notch by gravity; but, in order to make the dropping action more certain and positive, the compressing spring 37 carried on the reduced upper portion 34 of the plunger 33 is provided, so that the reduced section 41a would be forced into any one of the notches 45 when reached even though the gravity force was insufficient to insure such action.

In the slightly modified form of my device shown in Figure 10, the link 46 (which answers to the link 39 in the form of the device illustrated in Figure 7) is pivoted at its lower end to a horizontal arm 47 which has at its forward end an integral downwardly extending vertical section 48, which at its lower end is arranged to ride on the upper edge of the strip of paper 2, and to successively drop into the notches 45 as they are reached. The arm 47 is also provided with a curved slot 50 concentric with the pivot 49, and anchored in the lower end of the link 46 is a pintle 51 which passes out through the slot 50 and limits the movement of the arm 47 relative to the link 46. At the junction of the arm 47 with the vertical section 48 thereof is a rigid pintle 52 which extends inwardly through a slot 53 in the plate 17a.

The vertical section 48 has at its lower end an integral foot portion 54 (see Figure 14) which performs the same function as the section 41a, shown in Figure 8, and the plate 17a is cut away at 55 to permit this foot 54 to extend inwardly without interference with the downward extension 56 of the plate.

All the forms of this device have this downward extension, which forms a guide adapted to show when the reproducing stylus is moved to the proper place on the cylinder to pick up any part of the record designated on the strip of paper 2. It is designated by the numeral 20, in Figures 7 and 9.

In the modification shown in Figure 10 I have dispensed with the spring 37 and substituted therefore a small ball or weight 57 which serves a double purpose, since it not only affords sufficient pressure to cause the foot 54 to promptly drop into the notches 45 of the paper strip, but also serves as a most convenient lock nut for the nut 35 on the upper threaded end of the reduced part 34 of the plunger 33. This ball 57 is not only more convenient than a wing nut would be, but also forms a neat ornament at a point that is constantly in view of the operator.

In the modification shown in Figure 11, the piston 33 has in its bifurcated lower end a pivot 57 which connects it with a leg 58 inclined forwardly and downwardly, and terminating in a forwardly extending portion 59 which has a narrow heel 60 of a size to drop into the notches 45 when they are reached. When the heel 60 is in a notch 45, the foot 59 rests in parallel engagement with the top edge of the paper strip.

The foot portion 59 and the heel 60 thereof are made wide so as to project inwardly, just as does the foot portion 54 shown in Figure 14 of the drawings at the extreme lower end of the vertical section 48. The plate 17b is cut away at 61 to prevent this broadened portion of the foot 59 and heel 60 from contacting therewith as the heel moves into and out of the notches 45. The leg 58 has at its rear upper end a counterweight 62 which holds the leg by gravity in its forwardly inclined position. Its movement in this direction is limited by a stop 63 anchored in the plate 17b.

In the modifications shown in Figures 10 and 11, the fingers 56 are provided on their forward edges with vertically aligned points 64, instead of straight edges like the edge 19 in Figures 7 and 9. These points are spaced apart from each other the same distance as are the plungers 6 of the punch 5 of the recording machine, and are at the same horizontal elevation as are said plungers 6, so that as the fingers 56 traverse the strip of paper 2, the points 64 will follow the respective horizontal rows of punch marks.

In regard to these modified forms of the device, it is only necessary to barely refer to the fact that the punches used with the recording machines will of course be placed in the same position relative to the point of the recording stylus as are the aligned vertical points here placed with reference to the reproducing stylus. That is to say, if it is found expedient to place the punches to one side of the center of the recording diaphragm, then these circuit making and breaking devices are to be placed at a corresponding point at one side of the center of the reproducing diaphragm.

Figure 6:
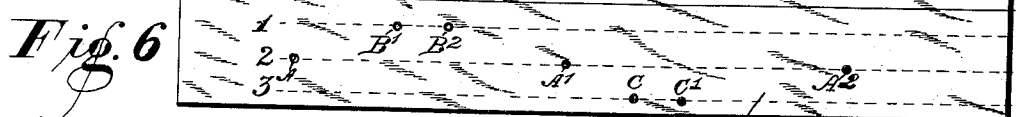
Figure 6 is a view on an enlarged scale of one of the strips of paper after it has been operated upon by the punching device on the recording machine and is ready to be transferred to the reproducing machine along with the phonographic cylinder containing the record to be transcribed.

The strip of paper 2 of my device is fully illustrated in Figure 6 of the drawings, and is practically divided longitudinally into as many parts as there are punches in the punching device. An integral narrow strip 65 at the upper side of the strip is preferably marked off by a full line 66 and thus separated from the rest of the strip and set apart for a very special service, independent of the use and functions of the rest of the strip. This portion 65 is reserved entirely for notches 45 which are very narrow, and have parallel forward and rearward sides, and are open at the top. The narrowness of the notches 45 makes it possible to place them close together when the requirements of the service make it necessary, and the upper punch 6a is adapted to cut narrow notches, whereas the other punches 6 punch round holes.

The rest of the strip of paper 2 is divided into three more sections by dotted lines numbered 1, 2, and 3. It will be noticed that these dotted lines come exactly opposite the punches 6 in the recording machine, and exactly under the points 64 in the reproducing machine.

The circular punch marks—A, A—1, A—2, B—1, B—2, C, C—1 on the dotted lines—perform functions very similar to the auxiliary record in my previous patent herein referred to (No. 1,770,326), but the construction and arrangement and employment of the narrow, open-topped, punch marks in the top edge of the strip of paper is something entirely new and useful in the art, inasmuch as it bears a direct and most useful relation to both the record on the wax cylinder and to that on the dotted lines 1, 2, and 3, on the lower portion of the strip of paper 2. Its functions will be fully brought out in the description of the operation of the device.

From what has already been said, it will be seen that my invention may be considered as simply an attachment or an accessory to an ordinary commercial dictating machine; and that to manufacture and sell it as such would be an extremely simple matter. The standard dictating machine itself would not have to be changed in any respect. It might be necessary to bore some holes in the lids of the motor boxes in order to mount thereon the rack for holding the strip of paper, though the rack might be adapted to utilize for that purpose openings already in the lids. At any rate, the boring of these holes with a hand drill would be such a simple matter that it could be done in the office where the machines were being used, without the loss of time that would be entailed by taking the machine out to a work shop and returning it. It must be manifest to any one experienced in the use of these machines that the attachment of this indexing device would greatly enhance their value.

The operation of the punch is so simple, and is so manifest from the drawings, as to scarcely need any further explanation. As it travels with the recording mechanism along the strip of paper 2, a punch mark will be made whenever any one of the plungers is sufficiently depressed. As has already been stated, the upper plunger 6a cuts a very narrow notch in the upper edge of the paper with the upper side of the notch open, while the other plungers preferably cut circular punch marks.

It is purely an arbitrary matter with the operator as to the general significations that shall be given to the circular punch marks on each of the respective dotted lines 1, 2, and 3 of the strip of paper, the principle involved here being broadly the same as that employed in written music employing round notes—the notes being all of the same shape, but with the specific, individual signification of each determined by its position on the musical staff.

Following up this principle, the punch marks on each line may be of a different shape, so that the shape of the punch mark in each instance will of itself indicate whether it is in the first, second or third vertical plane of the strip of paper, without reference to the dotted lines. To accentuate this idea, Figure 10 of the drawings shows circular punch marks in the position assigned to the first dotted line; square punch marks to that of the second dotted line; and triangular punch marks to that of the third dotted line, and the line-indicating numerals 1, 2, and 3 at the left end of the strip of paper are omitted, as are also the dotted lines themselves, so that the shape alone of each punch mark correctly indicates its proper vertical position on the strip of paper, aside from the fact that each punch mark is accurately placed at the proper vertical elevation on the strip.

Figure 11 shows still another variation in the punch marks, in that all the marks are circular, but the size of each indicates whether it is in the 1st., 2nd., or 3rd. vertical position on the strip—the upper marks being of small diameter, the next below them being of appreciably larger diameter, and those at the bottom of still larger diameter; or those at the bottom may be of any desired diameter either large or small, since their position at the bottom of the strip cannot be mistaken any more than could the position of the open notches 45 on the top edge of the strip. Another method of differentiation would be to provide backgrounds of different colors for the several lines of perforations.

The operation of the indexing devices in connection with the reproducing machine is as follows:—The wax cylinder and the strip of paper 2 are removed from the recording machine and placed on the reproducing machine (see Figure 4) in exactly the same position relative to each other that they occupied on the recording machine, the movable part of the circuit making and breaking mechanism being rigidly secured to the sound-box carriage 18, with the central line 19 of the plate 17 extending across the strip of paper 2 in exact vertical alignment with the center of the diaphragm or reproducing stylus, just as the vertical center of the punch 5 was in alignment with the center of the diaphragm or recording stylus of the recording machine when the records on the wax cylinder and the strip of paper were being produced, all of which is hereinbefore described in detail.

When the parts are in the position just described, the pintle 41a normally rests on the top edge of the strip of paper 2 and holds the plunger 33 in a slightly elevated position, so that the nuts 35 on the upper reduced end 34 of said plunger are held up out of engagement with the electrical contacts 29. The coil spring 37 (Figure 13) carried inside the block of insulation 24 (Figure 12) on the upper reduced end 34 of said plunger 33, is under compression when the plunger 33 is in its upward position, as just described. The contacts 29 are in an electrical circuit with the light bulb 67, but the space 32 between these contacts forms a gap in the circuit, so that the light is not lit while the plunger 33 is held in its upward position as the pintle 41a rides on the top edge of the strip of paper; but as the pintle travels along the top edge of the paper as the sound-box carriage advances, and drops into one of the open-sided notches 45, the plunger 33 drops, not only by the downward compression of the spring 37, but also by gravity. This permits the nuts 35 to drop down into engagement with the contacts 29 closing the electrical circuit thereby instantly lighting the bulb 67, which is always so located that it cannot fail to attract the attention of the transcriber, giving him notice that a point has been reached on the wax cylinder where a correction is to be made, as will be more fully described in the specific description of Figure 6. It is very desirable that this flash be quick and certain, and it is imperative that it be very brief because there may be another correction to be made very close to it, and hence the requirements of the service demand that the apparatus shall be capable of giving one flash after another in rapid succession. With this in mind special attention is here called to the performance of the pintle 45a and the parts connected therewith when one of the notches 45 is reached, since said parts cooperate in a very novel and yet most effective manner to produce the result just described. The notch 45 has vertical front and rear walls, and though very narrow is somewhat wider than the diameter of the pintle 45a.

As has already been specified, this pintle is arranged to rock on the joint 41, and the parts are preferably so arranged that when the pintle is on the top edge of the paper, the link 39 and the plunger 33, including the intermediate joint 38, are in exact vertical alignment with the pintle while the link 40, which is also connected with the pintle, controls the angle at which it rocks, and stands at an upward-and-forward angle of 45 degrees when the link 39 and the plunger 33 are in their vertical position. Hence, as the reproducing diaphragm carries the pintle forward along the top edge of the paper till a notch 45 is reached, the pintle drops into the notch, not by a vertical drop, but on a forward curve forming the arc of a circle having its center at the joint 42 and its circumference at 41. This will bring the pintle 41 in advance of the vertical central line of the diaphragm a distance equal to the difference between the diameter of the pintle and the width of the notch 45 and the lower end of the link 39 will, of course, he rocked forwardly the same distance in advance of the vertical center of the reproducing diaphragm or stylus. This closes the gap 32 and produces a flash of the bulb 67. Meanwhile, the sound-box carriage 18 and the plate 17 have not stopped, but as they are already in forward motion when the pintle falls against the forward wall of the notch 45, they instantly begin to move the pintle and the lower end of the link 39 back into vertical alignment with the center of the diaphragm and the guide line 19. This movement of the pintle which is relatively backward with reference to the plate 17 to which the lower end 42 of the link 40 is attached, causes the upper end 41 of said link to elevate the pintle to the top edge of the strip of paper just as the vertical central line of the diaphragm or stylus catches up, so to speak, with the forward leap which the pintle made when it first reached the notch 45. Hence the pintle simply climbs the forward wall of the notch 45 and therefore its upward movement is a true vertical movement, since it gained enough by its initial forward leap to compensate beforehand for variation from the vertical that would otherwise have been inevitable by reason of the forward movement of the pintle relatively to the stationary strip of paper.

Hence it will be seen that applicant has devised a useful and novel method for utilizing the pull of the pintle 41a on the vertical front wall of an open-sided notch 45 in the upper edge of a strip of paper for lifting the pintle out of the notch with great ease and suddenness, after having provided means for causing the pintle to run ahead of the mechanism which carries it, in order to promptly drop into the notch when it is reached.

The circular punch marks in the strip of paper indicate the relative positions on the wax cylinder where certain parts of the record occur, as will be presently more fully explained; and whenever it is desired to reproduce any one of these parts, it is only necessary to move the sound-box 18 to a point that will bring the line 19 of the finger 20 into registration with the desired punch mark. This will then insure that the reproducing stylus is in the proper position to reproduce the part desired.

In the modification shown in Figure 10, I have dispensed with the spring 37 for giving a downward impulse to the plunger 33 and substituted therefor the ball or weight 57 which utilizes gravity to make the narrow foot portion 54 drop promptly into the open-sided notches 45. As the plate 17a moves forwardly, the pull (or push) of the point or foot portion 54 against the forward wall of a notch 45 makes a fulcrum of the pivot 52 in the slot 53 to elevate the link 46, and through it the plunger 33, to elevate the nut 35 out of engagement with the contact plates 29, and thus open the gap 32 in the electric circuit. This form of the device is also constructed with reference to quick action, since the slot 53 causes the weight of all the movable parts attached to the plate 17a to rest on the foot 54 so as to cause it to promptly drop into a notch 45 and thus close the electric circuit to give a signal flash. The relative lengths of the arm 47 and the vertical downward extension thereof may be varied to give the desired upper movement of the plunger 33 to break the electrical circuit.

The modified form of the device illustrated in Figure 11 is constructed with special reference to obtaining the maximum quickness in the breaking of the circuit. The heel portion 60 of the foot 59 is positioned to be exactly on the vertical line passing through the forward ends of the points 64 when said heel is in a notch 45. This will cause the heel when riding on the top edge of the strip of paper to be slightly in advance of said vertical line which is supposed to be in the same relative position to the sound-box carriage 18 as is the line 19 in Figure 7. This being the case, the heel 60 will drop into a notch 45 almost, if not quite before it is reached by the points 64; and then as the plate 17b advances the pressure of the heel against the forward wall of the notch will make a fulcrum out of the toe of the shoe at 68 and thereby elevate the heel very quickly and in much the same way that the heel of a person is elevated as he leans forward on his foot in walking. Thus the heel will be almost instantly extricated from the notch 45, which will in turn break the electric circuit and extinguish the light 69.

Figure 6 represents a correction slip, produced in the following manner by the dictator: Perforation A in the second line of perforations indicates the beginning of a letter, and perforation A—1 in the same line dicates the end of the letter, these perforations in the second line enabling the transcriber to judge of the length of letters and thus to give them the proper position on the letter head and to determine whether to set the typewriting machine at single or double space, etc. The marginal cut 45 produced by the punch on the upper edge of the strip, indicates the point on the wax cylinder record where a correction is to be made, and it is at this point, due to the pin dropping into said marginal cut, that the electrical circuit which controls the signal is closed. Perforation B—1, in the first line of perforations, indicates the point at which the dictator begins to dictate the correction matter to be supplied at the point at which the signal is given, i. e., at 45; and B—2 indicates the point at which the dictation of the correction matter is concluded. C and C—1 indicate the points between which a telegram or some rush matter is dictated, and the perforation A—2 indicates the point at which the dictation of the second letter on said record was concluded. The order in which these indications were given by the dictator is as follows: Perforation A was at the beginning of the dictation to indicate the commencement of a letter; when he had proceeded with his dictation to the point indicated by the perforation B—1, he discovered that an error had been made in his dictation, which he located at the point indicated by the marginal cut 45; when he located the point of correction, he manipulated the punch so as to produce marginal cut 45, and set his recorder back to the point at which he discovered that an error had been made, and at which he suspended his dictation, to wit: The point indicated by the perforation B—1; he then manipulated the punch so as to produce said perforation B—1 and dictated the correction matter to be supplied at correction and signal point 45. When he concluded the dictation of correction matter, he manipulated his punch so as to produce the perforation B—2, and then resumed the dictation of his letter, which had been interrupted at B—1. At the conclusion of the letter, he manipulated the punch so as to produce the perforation A—1, indicating the conclusion of the letter, these perforations A and A—1, as above stated, serving to apprise the transcriber of the length of the letter. The perforation A—1, indicating the end of the first letter, also indicates the beginning of the second letter. When the dictator had dictated to the point indicated by perforation C in the third line of perforations, he suspended the dictation of his letter in order to dictate a telegram or some rush matter, to be transcribed ahead of everything else on the record, and on the conclusion of this dictation he manipulated the punch so as to produce perforation C—1. He then resumed the dictation of his letter, and at its conclusion manipulated the punch to produce perforation A—2. It will be noted that, while a correction and a telegram were dictated on the cylinder accompanying this index strip, no dictation space whatever was lost, the indexing system enabling the dictator to provide for corrections and other emergency matter, without the reservation of space which might or might not be used.

It is hardly necessary to point out that the allotment of space on the index strip to the different indication purposes served thereby, with the sole exception of corrections, is entirely optional with the user. Since correction indications require the use of a signal detached from, but operated in conjunction with, the index strip, it has been found expedient to utilize the top edge of the paper strip for that particular purpose. The notches in the upper edge of the index strip have been compared to the caret sign used to indicate points where corrections or insertions are to be made in written or printed matter, and, to carry the analogy further, the flash light in this indexing system may be said to correspond to the asterisk in the body of the text, while the perforations in the first line correspond to the asterisk as used to indicate the marginal references or foot notes to which the caret and first mentioned asterisk invite the reader's attention. Briefly stated, applicant has seen proper to allot the central portion of the index strip to the routine indication of length of letters, reserving the portions nearer the edges for the two occasional or emergency indications, one being to corrections and the other to telegrams or other rush matter.

When the correction slip and cylinder accompanying the same are delivered to the transcriber, he glances first at the third line of perforations to see if there is any rush matter to be transcribed ahead of all other matter on the cylinder. Therefore, pursuant to the system, he first transcribes the matter recorded between the points C and C—1. He then sets the reproducer back to the point indicated by perforation A, notes the distance between A and A—1 so as to determine the position to be given the letter on the page, etc. When he has proceeded with his transcription to the point indicated by marginal cut 45, he receives a signal (preferably a flash or a gong), signifying that he must stop his transcription, and manually sets his reproducer forward over to the point indicated by perforation B—1 and writes in the correction. When the correction is made, the correction matter being dictated between points B—1 and B—2, he manually sets his reproducer back to the point of correction 45, and resumes his transcription, until he reaches B—1, when he manually moves his reproducer forward to B—2, avoiding a repetition of correction matter between B—1 and B—2. In transcribing the second letter, from A—1 to A—2, the transcriber likewise manually sets his reproducer forward over the cylinder space between C and C—1, where the telegram already transcribed is recorded.

In effecting the purposes of the invention, it should be noted that it is not essential that the control record bearing the notches on its edge should be of insulating material, and the use of paper is indicated in the specification not because of its insulating properties, but solely because of its easily perforable character and general availability for use in forming the master or control record. It will be observed that the function of the strip of paper, or whatever other material is used to form the control record, is purely mechanical, in that the notches formed in the edge thereof are utilized as a mechanical means to positively engage the pintle 41—a so as to arrest its horizontal forward motion and impart to it a vertical motion along the straight front edge of the notch with which it is engaged. In the forms of application of the principle of the invention wherein an electrical circuit is employed to actuate an indicator, whether a light or a gong, it is important that the pintle 41—a should be of insulating material, as, for instance, whalebone, gutta-percha, or metal coated with some insulating substance, to avoid the effect of accidental contact between said pintle and the metal portion of the rack used to support the control record where the metal portions of the machine or rack form a part of the circuit. In the most direct forms of application of the invention, no electrical circuit of any sort is employed, the spring or gravity-impelled drop of the pintle 41—a into the notches of the control record being made use of, through purely mechanical means, to actuate the indicator. This mechanical force brought into play by the spring or gravity-impelled drop of the pintle 41—a into the notches of said control record may be used to actuate a variety of forms of mechanical indicator means, such, for instance, as a gong.

Figure 15 is a modification of applicant's invention showing purely mechanical means for audibly arresting the attention of the transcriber when the pintle 41 drops into a notch 45.

In this modification the upper end of the reduced portion 34 of the plunger 33 is pivotally connected at 70 to a bell-ringing lever 71 which strikes a bell 72 every time the pintle 41 drops into a notch 45 cut into the strip of paper 2. This bell-ringing lever 71 and the bell 72 are supported adjacent the upper end of the plate 17, and are surrounded by a hood 73, which has a hollow nipple at its upper end for engagement with the branch 74 of the Y-shaped listening tube 75, bearing the ear-pieces 76.

The above described modification provides means purely mechanical, as distinguished from means that are at least partly electrical, for arresting the attention of the transcriber.

In this connection, attention is called to the fact that the notches 45, in the upper edge of the index strip, are deep as compared either with their width or with the thickness of the material of which the strips are formed. One primary reason for this is that a deep notch, when it is dropped into by the actuator, gives sufficient movement to said actuator to insure reliable operation of the signaling mechanism, especially when electricity is not employed, and purely mechanical means relied upon to operate the signal.

For manifest reasons these strips are preferably made of paper, as has already been stated; and since the paper has to be punched, it is desirable that the paper be as thin as possible in order to give reliable service. But when the strips are set up on edge, it makes no difference how thin the paper is, in so far as the depth of the notches is concerned, because as deep a notch can be cut into the edge of a thin piece of paper as into a thick piece.

If applicant's piece of paper were arranged to be laid on its side, when in operative position on the machine, the paper would have to be very thick in order to get notches deep enough to give the actuator a sufficient drop, when a notch was reached, to reliably perform its work.

In some devices of this character where electricity is employed, the index strips are laid on a flat plate forming a link in an electric circuit; and a point above the plate, movable toward and from it, and also in the electric circuit, is arranged to travel along on the upper side of the index strip till it comes to a perforation in the strip, and into which perforation it drops and contacts with the plate underneath the strip, whereby the circuit is closed and the signal operated. In cases of that kind, the paper strip forms an insulator between the plate and the contact point above it, till the point reaches one of the perforations placed in its path as it traverses the index strip. In such a case, the downward movement of the contact point need only be a distance equal to the thickness of the paper strip even when the strip is thin; but in applicant's arrangement, the depth of the notch must be greater than the thickness of ordinary paper, which, however, is plenty thick enough for applicant's purpose if it is set on edge. Hence, the employment of comparatively thin paper, and especially the setting up of the paper strip on edge in applicant's arrangement is not an incidental feature, but on the contrary, is of the very essence of the invention, and enables him to make use of gravity, or other means purely mechanical, in the operation of his device, instead of means either partially or wholly electrical.

Having now described my invention, and shown certain practical applications and embodiments of the same, what I claim as new and desire to protect by Letters Patent is:

1. In a device of the character described, a phonographic record composed of different parts to be reproduced in a different order from the order in which they appear in the record; and an index member for indicating the relative points on the record where the order of transcription varies from the order of production; and means for automatically notifying the transcriber when a point is reached by the reproducing stylus where the continuity of the main record is to be broken in the transcription; said index member consisting of a strip of material with the indications thereon consisting of deep notches in the strip opening out through the edge thereof; said automatic notifying means being controlled by said strip and mechanically operated by said deep notches, and including mechanism advancing with the reproducing stylus and traveling along said index member in engagement with the edge thereof as contradistinguished from the sides thereof, and arranged to suddenly drop deeply into said notches from the edge of the strip through their open sides by gravity, as they are successively reached and to be suddenly lifted out.

2. In a device of the character described, a phonographic record composed of different parts continuously produced but to be transcribed in a different order from the order in which they were produced; and an index member for indicating the relative points on the record where the order of transcription varies from the order of production; and means for automatically notifying the transcriber when a point is reached by the reproducing stylus where the continuity of the main record is to be broken in the transcription; said index member consisting of a strip of material held in vertical position and extending in longitudinal parallelism with the record cylinder, and provided with deep open-sided notches in the upper edge of the strip at points in the longitudinal extent thereof opposite the corresponding longitudinal points on the cylinder where changes occur therein; said automatic notifying means being controlled by said strip and mechanically operated by said deep notches, and including a mechanism advancing with the reproducing stylus and riding along on the upper edge of said index member and arranged to suddenly drop deeply into said notches through their open upper sides by gravity as they are successively reached, and as suddenly lifted out.

3. A device of the character described, comprising a rotary record member having points in the record where changes are to be made in transcribing the record; a signal for indicating said points; a stationary index strip mounted on edge for indicating the relative points in said record where the signal is to be operated, said strip having on its upper edge open-sided notches deep and narrow with vertical forward edges; and non-electrical operating mechanism for the signal including a member adapted to travel along said upper edge in synchronism with the reproducing stylus and to suddenly drop into said notches by gravity when they are reached to operate the signal; said mechanism being also operable by the push of the advancing mechanism against said vertical forward side of the notch to lift said member vertically out of the notch.

4. A device of the character described, comprising a horizontally disposed record member having points in the record thereon where changes are to be made in transcribing the record; an electrically operated signal for indicating said points; operating means for the signal, including (1) an electrical circuit having a gap therein, and a member movable up and down for opening and closing said gap, and (2) a stationary index strip mounted on edge for indicating the relative points where the signal is to be operated, said strip having on its upper edge open-sided notches narrow and deep with vertical forward edges; a member adapted to travel in synchronism with the reproducing stylus and carrying a toggle pivoted at its lower end to said member, with its upper portion free to move up and down as the toggle is operated, the toggle being connected at its upper end to said gap-opening and closing of the electrical signal-operating mechanism whereby to control the signal when said member is moved up and down, the toggle having at its middle joint a narrow lateral projection arranged to extend across the top edge of said stationary strip and to normally rest thereupon, supporting the toggle in its elevated position, which is arranged to open the gap in the electric circuit, said projection being of a width to easily drop into said notches as they are reached, whereby, as the toggle advances with the reproducing stylus, the lateral projection at the middle joint of the toggle will be pushed against the forward vertical wall of the notch into which said narrow projecting portion has dropped, which will operate the toggle tending to straighten the same, thereby causing the projection to climb said vertical wall until the top of the strip is again reached, whereby said lateral projection is moved out of said notches in a vertical direction, while the member carrying it is advancing in a horizontal direction, and the signal-operating mechanism is thereby quickly brought into inoperative position.

5. A device of the character described, comprising a horizontally disposed record member having points in the record thereon where changes are to be made in transcribing the record; an electrically operated signal for indicating to the transcriber where the changes are to be made; controlling means for the signal comprising a stationary index strip mounted on edge for indicating the relative points in the record where the changes are to be made, said strip having on its upper edge narrow open-sided notches comparatively deep with vertical forward edges; a member adapted to travel in synchronism with the reproducing stylus and carrying a toggle pivoted at its lower end to said member with its upper portion free to move up and down as the toggle is operated, the toggle being arranged at its upper end to open and close a gap in the electric circuit as it is moved upwardly and downwardly, the toggle having at its middle joint a narrow lateral projection arranged to extend across the top edge of said stationary strip and to normally rest thereupon, supporting the toggle in its elevated position which holds open the gap in the electric circuit, said projection being of a width to easily drop into said notches as they are reached, whereby the gap in the electric circuit is closed and the signal is operated, and then, as the toggle advances with the reproducing stylus, the lateral projection at the middle joint of the toggle will be pushed against the forward vertical wall of the notch into which said narrow projecting portion has dropped, which push will operate to straighten the toggle, thereby causing the projection to climb said vertical wall until the top of the strip is reached, whereby said lateral projection is moved out of said notches in a vertical direction, while the member carrying it is advancing uninterruptedly in a horizontal direction and the electric circuit is thereby quickly broken.

6. In sound-reproducing machines, a record member; a reproducer adapted to traverse said member; a vertical index strip detachably mounted in a predetermined relation to the record member, said strip having narrow open-sided notches in its upper edge; an electric circuit having a gap therein, and a signal included in said circuit; a vertical plunger traveling in synchronism with the reproducer, and having a bridge at its upper end for opening and closing said gap, said bridge being normally held above the gap in the electric circuit out of engagement with the sides thereof, the plunger being provided at its lower end with mechanism having a reduced portion arranged to travel along the upper edge of the index strip to support the plunger thereupon, and to drop into said notches, as they are successively reached, said notches being of a depth to permit the bridge member in its elevated position at the upper end of the plunger to drop down into engagement with the opposing sides of the gap to close the same and thereby operate the signal when the plunger drops into a notch in the index strip; said mechanism being also operable by the resistance of the vertical front wall of a notch of the index strip to the advancing movement of the plunger, to lift the plunger out of said notch and restore it to its normal position on the top of the index strip, thereby again elevating the bridge member at the top of the plunger, and opening the gap in the electric circuit.

7. In sound-reproducing machines, a record member; a reproducer adapted to traverse said member; a vertical index strip detachably mounted in a predetermined relation to the record member, said strip having narrow open-sided notches in its upper edge; an electric circuit having a gap therein, and a signal included in said circuit; a vertical plunger traveling in synchronism with the reproducer, and having a bridge at its upper end for opening and closing said gap, said bridge being normally held above the gap in the electric circuit out of engagement with the sides thereof, the plunger being provided at its lower end with mechanism having a reduced portion arranged to travel along the upper edge of the index strip to support the plunger thereupon, and to drop into said notches, as they are successively reached, said notches being of a depth to permit the bridge member in its elevated position at the upper end of the plunger to drop down into engagement with the opposing sides of the gap to close the same and thereby operate the signal when the plunger drops into a notch in the index strip; said mechanism being operable as the plunger advances and successively drops into said notches, to automatically lift the same out of said notches and restore it to its normal position supported on top of the index strip, thereby elevating the bridge member at the top of the plunger to open the gap in the electric circuit.

8. In sound-reproducing machines, a record member; a reproducer adapted to traverse said member; a vertical index strip detachably mounted in a predetermined relation to the record member, said strip having in its upper edge narrow open-sided notches with vertical front walls; an electric circuit having a gap therein, and a signal included in said circuit; a vertical plunger traveling in synchronism with the reproducer, and having a bridge at its upper end for opening and closing said gap, said bridge being normally held above the gap in the electric circuit out of engagement with the sides thereof, the plunger being provided at its lower end with operating mechanism having a reduced portion arranged to travel along the upper edge of the index strip to support the plunger thereupon, and to drop into said notches, as they are successively reached, said notches being of a depth to permit the bridge member in its elevated position at the upper end of the plunger to drop down into engagement with the opposing sides of the gap to close the same and thereby operate the signal when said reduced portion of the plunger operating mechanism drops into a notch in the index strip; said mechanism at the lower end of the plunger being also arranged, as the plunger advances and said reduced portion of said mechanism successively drops into said notches, to automatically lift the same out of said notches and restore it to its normal position supported on top of the index strip, thereby elevating the bridge member at the top of the plunger to open the gap in the electric circuit, said mechanism being operable by the resistance of the vertical front wall of a notch to the advance movement of said reduced portion of the plunger operating mechanism as it successively drops into said notches, and encounters their respective vertical front walls.

9. In sound-reproducing machines, a record member; a reproducer adapted to traverse said member; a vertical index strip detachably mounted in a predetermined relation to the record member, said strip having narrow open-sided notches in its upper edge; an electric circuit having a gap therein, and a signal included in said circuit; a vertical plunger traveling in synchronism with the reproducer, and having a bridge at its upper end for opening and closing said gap, said bridge being normally held above the gap in the electric circuit out of engagement with the sides thereof, the plunger being provided at its lower end with mechanism having a reduced portion arranged to travel along the upper edge of the index strip to support the plunger thereupon, and to drop into said notches, as they are successively reached, said notches being of a depth to permit the bridge member in its elevated position at the upper end of the plunger to drop down into engagement with the opposing sides of the gap to close the same and thereby operate the signal when the plunger drops into a notch in the index strip; said mechanism connected with the lower end of the plunger, and normally supported on the upper edge of the index strip to cooperate with the notches therein being also arranged for quickly lifting the advancing plunger vertically out of said notches and restoring it to its normal position supported on the top edge of the index strip.

10. In sound-reproducing machines, a record member; a reproducer adapted to traverse said member; a vertical index strip detachably mounted in a predetermined relation to the record member, said strip having narrow open-sided notches in its upper edge; an electric circuit having a gap therein, and a signal included in said circuit; a vertical plunger traveling in synchronism with the reproducer, and having a bridge at its upper end for opening and closing said gap, said bridge being normally held above the gap in the electric circuit out of engagement with the sides thereof, the plunger being provided at its lower end with mechanism having a reduced portion arranged to travel along the upper edge of the index strip to support the plunger thereupon, and to drop into said notches, as they are successively reached, said notches being of a depth to permit the bridge member in its elevated position at the upper end of the plunger to drop down into engagement with the opposing sides of the gap to close the same and thereby operate the signal when the plunger drops into a notch in the index strip; said mechanism at the lower end of the plunger being operable by the forward movement of said reduced portion thereof against the vertical front wall of a notch, to automatically lift the same vertically out of said notches, whereby to quickly restore the plunger to its normal upper position supported on the top edge of the index strip, with the gap in the electric circuit open, and the plunger in position to engage another notch when it is reached.

11. A sound-reproducing machine, comprising a rotating record member having parts to be rearranged in transcription; a reproducer adapted to traverse said member; an index strip of thin material previously provided in its edge with notches for indicating the relative points in the record member where changes are to be made; means for detachably locating the index strip on edge in a predetermined relation to the record member and with its notched edge uppermost; an actuator cooperating with the index strip; means for moving the actuator in synchronism with the movement of the reproducer; a bell and a striker therefor operatively connected with the actuator, said actuator being normally supported on the upper edge of the index strip to traverse the same as the reproducer advances on the record, and adapted to drop into the perforations as they are reached, said actuator being arranged, when in its normal position on the top edge of the index strip, to hold the bell striker in its elevated position ready to strike, and permitting the striker to drop and thereby ring the bell when the actuator drops into a notch; whereby to indicate to the transcriber that a place has been reached where the continuity of the record is to be broken.

12. A sound-reproducing machine, comprising a rotatable record member; a reproducer adapted to traverse said member; a previously perforated strip of thin material having deep notches in the edge of the strip leading out through said edge, the walls of the front sides of said notches being disposed at right angles to the longitudinal extent of the strip; means for detachably locating said strip on edge in a predetermined relation to the reproducer and with its notched edge uppermost, whereby to bring said right-angled front walls of the notches to the vertical in the direction of their depth; an actuator cooperating with said strip; means for moving the actuator in synchronism with the reproducer; a bell and a striker therefor operatively connected with the actuator, said actuator being normally supported on the upper edge of the perforated strip to traverse the same as the reproducer advances on the record, and adapted to drop into the notches as they are reached, entering them from their open upper ends, said actuator being arranged when in its normal position on the edge of the perforated strip, to hold the bell striker in its elevated position ready to strike, and permitting the striker to drop by gravity and thereby ring the bell when the actuator drops into a notch, said notches being narrow to permit them to be placed close together when required, and being of a depth to permit a sufficient drop of the actuator to effect a suitable stroke of the bell, the advance movement of the actuator against the vertical forward wall of a notch being operable to lift the actuator vertically out of the notch, returning it to the top edge of the perforated strip, whereby to again elevate the striker to its normal striking position.

13. A sound-reproducing machine, comprising a rotatable record member having parts to be rearranged in transcription; a reproducer adapted to traverse said member; a previously perforated strip of thin material having deep notches in the edge of the strip leading out through said edge, said notches being located in the strip in predetermined relation to the points in the record where changes are to be made by the transcriber, the walls of the front sides of said notches being at right angles to the longitudinal extent of the strip; means for detachably locating the perforated strip on edge in a predetermined relation to the reproducer and with its notched edge uppermost, thereby bringing said right-angled front walls of the notches to the vertical in the direction of their depth; an actuator cooperating with said strip; means for moving the actuator in synchronism with the reproducer; a bell and a striker therefor operatively connected with the actuator and its cooperating perforated strip, said actuator being normally supported on the upper edge of said strip to traverse the same as the reproducer advances on the record member, and adapted to drop into the notches as they are reached, said actuator being arranged when in its normal position on the top edge of the indicator strip, to hold the bell-striker in its elevated position ready to deliver a stroke, and permitting the striker to drop and thereby ring the bell when the actuator drops into a notch; whereby to indicate to the transcriber that a place has been reached where the continuity of the record is to be broken.

14. A sound-reproducing machine, comprising a rotatable record member; a reproducer adapted to traverse said record member; an index strip of thin material; means for mounting said strip on edge in a predetermined relation to the record member, said strip being perforated on its upper edge; an electrical circuit; an indicator, and contacts in said circuit, said contacts being movable into and out of abutting engagement with each other; an actuator traveling in synchronism with the reproducer and riding on the upper perforated edge of the index strip, and operatively connected with said contacts and arranged to move them into and out of abutting engagement with each other, whereby to electrically operate the indicator when the actuator contacts a perforation of the index strip.

15. A sound-reproducing machine, comprising a rotatable record member; a reproducer adapted to traverse the record member; an index strip of thin material; means for mounting the strip on edge in a predetermined relation to the record; said strip being provided with narrow, vertical notches having parallel sides and opening out through its upper edge; an indicator and an actuator operatively connected therewith, and with the reproducer, the actuator being adapted to ride along on the notched edge of the index strip in synchronism with the reproducer and cooperating with the notches in the index strip, said actuator being adapted to operate the indicator when the actuator drops into one of the notches through its open upper side, and to be lifted out of operative position when it encounters the vertical front wall of a notch, the actuator being of a size to snugly fit the notches in the strip, whereby the upward movement of the advancing actuator begins immediately when the actuator has reached its lowest point in a notch.

16. A sound-reproducing machine, comprising a rotatable record member; a reproducer adapted to traverse the record member; an index strip of thin material mounted on edge in predetermined relation to the record member, said strip having notches opening out through its upper edge; an actuator operatively connected with the reproducer to travel in synchronism therewith being supported on said upper edge of the index strip and adapted to traverse the same to successively drop into said notches through their open upper ends, the depth of the notches regulating the depth of the drop that the actuator may be permitted to make, the strip of thin material being mounted on edge to permit the notches to be made as deep as may be desired without adding to the thickness of the strip; an electric circuit; contacts, and an electrically operated indicator in said circuit, said contacts being arranged to travel in unison with the reproducer, whereby to render them stationary relative to the reproducer as it traverses the record member, said contacts being also arranged for aligned movement into and out of contact with each other, whereby to adapt the contacts for abutting engagement with each other; and operative connections between the traversing actuator and said relatively stationary contacts to move said contacts into abutting engagement with each other when the actuator drops into a notch of the index strip.

17. A sound-reproducing machine, comprising a rotatable record member; a reproducer adapted to traverse the record member; an index strip of thin material mounted on edge in predetermined relation to the record member, said strip having notches opening out through its upper edge; an actuator arranged to travel in synchronism with the reproducer, and supported on said upper edge and adapted to traverse the same to successively drop into said notches through their open upper ends, the depth of the notches regulating the depth of the drop that the actuator may be permitted to make, the strip of thin material being mounted on edge to permit the notches to be made as deep as may be desired without adding to the thickness of the strip; an electric circuit; contacts, and an electrically operated indicator in said circuit, said contacts being arranged to travel in unison with the reproducer whereby to render them stationary relative to the reproducer as it traverses the record member, said contacts being also arranged for aligned movement into and out of contact with each other, whereby to adapt the contacts for abutting engagement with each other; operative connections between the traversing actuator and said relatively stationary contacts to move said contacts into abutting engagement with each other when the actuator drops into a notch of the index strip; and means independent of the notches in the index strip for limiting the up-and-down movement of the actuator when a notch is reached.

18. A sound-reproducing machine, comprising a rotatable record member; a reproducer adapted to traverse the record member; an index strip of thin material mounted on edge in predetermined relation to the record member, said strip having notches opening out through its upper edge; an actuator arranged to travel in synchronism with the reproducer, and supported on said upper edge and adapted to traverse the same to successively drop into said notches through their open upper ends, the depth of the notches regulating the depth of the drop that the actuator may be permitted to make, the strip of thin material being mounted on edge to permit the notches to be made as deep as may be desired without adding to the thickness of the strip; an electric circuit; contacts, and an electrically operated indicator in said circuit, said contacts being arranged to travel in unison with the reproducer whereby to render them stationary relative to the reproducer as it traverses the record member, said contacts being also arranged for aligned movement into and out of contact with each other, whereby to adapt the contacts for abutting engagement with each other; operative connections between the traversing actuator and said relatively stationary contacts to move said contacts into abutting engagement with each other when the actuator drops into a notch of the index strip; and means independent of the notches in the index strip for limiting the up-and-down movement of the actuator when a notch is reached; and means independent of the depth of the notches in the index strip for varying the normal distance of the contacts from each other.

19. A sound-reproducing machine, comprising a rotatable record member; a reproducer adapted to traverse the record member; an index strip of thin material mounted on edge in predetermined relation to the record member, said strip having notches opening out through its upper edge; an actuator arranged to travel in synchronism with the reproducer, and supported on said upper edge and adapted to traverse the same to successively drop into said notches through their open upper ends, the depth of the notches regulating the depth of the drop that the actuator may be permitted to make, the strip of thin material being mounted on edge to permit the notches to be made as deep as may be desired without adding to the thickness of the strip; an electric circuit; contacts, and an electrically operated indicator in said circuit, said contacts being arranged to travel in unison with the reproducer, whereby to render them stationary relative to the reproducer as it traverses the record member, said contacts being also arranged for aligned movement into and out of contact with each other, whereby to adapt the contacts for abutting engagement with each other; operative connections between the traversing actuator and said relatively stationary contacts to move said contacts into abutting engagement with each other when the actuator drops into a notch of the index strip; means independent of the notches in the index strip for limiting the up-and-down movement of the actuator when a notch is reached; means independent of the depth of the notches in the index strip for varying the normal distance of the contacts from each other; and adjustable means independent of the depth of the notches in the index strip for regulating the distance of the abutting and receding movements of the contacts within the limits determined by the depth of the notches in the index strip.

20. A sound-reproducing machine, comprising a rotatable record member; a reproducer adapted to traverse the record member; an index strip of thin material mounted on edge in predetermined relation to the record member, said strip having notches opening out through its upper edge; an actuator arranged to travel in synchronism with the reproducer, and supported on said upper edge and adapted to traverse the same to successively drop into said notches through their open upper ends, the depth of the notches regulating the depth of the drop that the actuator may be permitted to make, the strip of thin material being mounted on edge to permit the notches to be made as deep as may be desired without adding to the thickness of the strip; an electric circuit; contacts; and an electrically operated indicator in said circuit, said contacts being arranged to travel in unison with the reproducer, whereby to render them stationary relative to the reproducer as it traverses the record member, said contacts being also arranged for aligned movement into and out of contact with each other, whereby to adapt the contacts for abutting engagement with each other; operative connections between the traversing actuator and said relatively stationary contacts to move said contacts into abutting engagement with each other when the actuator drops into a notch of the index strip; means independent of the notches in the index strip for limiting the up-and-down movement of the actuator when a notch is reached; means independent of the depth of the notches in the index strip for varying the normal distance of the contacts from each other; adjustable means independent of the depth of the notches in the index strip for regulating the distance of the abutting and receding movements of the contacts within the limits determined by the depth of the notches in the index strip; and adjustable means for varying the maximum required depth of the notches in the index strip.

21. A sound reproducing machine, comprising a rotatable record member; a reproducer adapted to traverse the record member; a previously perforated index strip; means for detachably locating the strip on edge in a predetermined relation to the record member, said perforations consisting of narrow U-shaped notches in the edge of the strip, said notches being of a vertical depth greater than the thickness of the strip and opening out through the upper edge of the strip; an actuator and an indicator operated thereby, said actuator being arranged to traverse said upper edge in synchronism with the reproducer, and pressed downwardly by gravity into engagement with said edge to cause it to successively drop by gravity into said deep notches; whereby the actuator, when it enters a notch travels a vertical distance enough greater than the thickness of the strip, and far enough to give ample movement to the actuator to reliably operate the indicator.

22. A sound reproducing machine, comprising a rotatable record member; a reproducer adapted to traverse the record member; a previously perforated index strip; means for detachably locating the strip on edge in a predetermined relation to the record member, said perforations consisting of narrow U-shaped notches in the edge of the strip, said notches being of a vertical depth materially greater than their width from front to rear or than the thickness of the strip, and opening out through the edge of the strip; an actuator and an indicator operated mechanically thereby, said actuator being arranged to traverse said edge in synchronism with the reproducer and pressed by gravity into engagement with said edge to cause it to successively drop into said deep notches; whereby the actuator when it drops into a notch travels a distance materially greater than the thickness of the strip or the width of the notch in order to give ample movement to the actuator to mechanically operate the indicator.

23. A sound reproducing machine, comprising a rotatable record member; a reproducer adapted to traverse the record member; a previously perforated index strip; means for detachably locating the strip in a predetermined relation to the record member, said perforations consisting of narrow notches in the edge of the strip having their forward walls extending at right angles to the longitudinal extent of the strip, said notches being of a depth greater than the thickness of the strip and opening out through the edge of the strip; an actuator and an indicator operated thereby, said actuator being arranged to traverse said edge in synchronism with the reproducer and pressed into engagement with said edge to cause it to successively drop into said notches; whereby the actuator when it drops into a notch travels a distance greater than the thickness of the strip in order to give ample movement to the actuator to operate the indicator; and means when the actuator has dropped into a notch, for lifting the same out of the notch and restoring it to its normal position on the upper edge of the index strip.

24. A sound reproducing machine, comprising a rotatable horizontally disposed record member; a reproducer for traversing said member; an indicator strip previously provided with notches opening out through one of its edges; means for detachably locating the said strip on edge in a predetermined relation to the record member, the notched edge of the strip being uppermost and disposed parallel with the record member; an indicator and operating mechanism therefor; an actuator connected with said mechanism and adapted to ride along said notched upper edge of the index strip in synchronism with the reproducer, and arranged to drop by gravity into said notches to operate the indicator, said mechanism being adapted to mechanically lift the actuator vertically out of said notches as the mechanism with which it is connected advances horizontally on the index strip in interrupted unison with the reproducer.

25. A sound reproducing machine, comprising a rotatable record member; a reproducer adapted to traverse the record member; an index strip of thin material detachably mounted on edge in a predetermined relation to the record member, and previously perforated in its upper edge; an actuator moving in synchronism with the reproducer and arranged to ride on said notched upper edge of the index strip and to drop into the notches as they are successively reached; and an indicator operable by the vertical travel of the actuator as it drops into a notch in the index strip, whereby the vertical movement of the actuator when it encounters a notch in the index strip, operates the indicator.

ROBERT J. SPEIR.